US012418356B2

(12) United States Patent
Bock et al.

(10) Patent No.: US 12,418,356 B2
(45) Date of Patent: Sep. 16, 2025

(54) METHOD FOR PREVENTING A VOICE FROM BEING INTERCEPTED

(71) Applicant: AUDI AG, Ingolstadt (DE)

(72) Inventors: Florian Bock, Nuremberg (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 299 days.

(21) Appl. No.: 18/258,094

(22) PCT Filed: Dec. 1, 2021

(86) PCT No.: PCT/EP2021/083699
§ 371 (c)(1),
(2) Date: Jun. 16, 2023

(87) PCT Pub. No.: WO2022/128461
PCT Pub. Date: Jun. 23, 2022

(65) Prior Publication Data
US 2024/0056215 A1 Feb. 15, 2024

(30) Foreign Application Priority Data
Dec. 16, 2020 (DE) ..................... 10 2020 133 648.9

(51) Int. Cl.
*H04K 3/00* (2006.01)

(52) U.S. Cl.
CPC ................. *H04K 3/41* (2013.01); *H04K 3/42* (2013.01); *H04K 2203/12* (2013.01); *H04K 2203/22* (2013.01)

(58) Field of Classification Search
CPC ........ H04K 3/41; H04K 3/42; H04K 2203/12; H04K 2203/22; H04K 3/45; H04K 2203/34; H04K 3/825; G10K 11/1754
See application file for complete search history.

(56) References Cited

U.S. PATENT DOCUMENTS 10,440,467 B1 10/2019 You et al.
2004/0259494 A1* 12/2004 Mazar .................... H04K 3/825 455/1

(Continued)

FOREIGN PATENT DOCUMENTS

DE 102018221120 A1 1/2020
EP 2876639 A2 5/2015

(Continued)

OTHER PUBLICATIONS

International Search Report and Written Opinion of the International Searching Authority directed to related International Patent Application No. PCT/EP2021/083699, mailed Mar. 21, 2022, with attached English-language translation; 21 pages.

(Continued)

*Primary Examiner* — Ping Y Hsieh
(74) *Attorney, Agent, or Firm* — Sterne, Kessler, Goldstein &Fox P.L.L.C.

(57) ABSTRACT

The present disclosure relates to a method for preventing the voice of at least one person in a vehicle from being intercepted. At least one loudspeaker in the vehicle is activated, wherein the at least one loudspeaker is used to generate audio signals which have at least one frequency that is higher than the threshold frequency for sound that is audible to the at least one person, and the audio signals are used to interfere with the reception of a signal by means of at least one microphone when the at least one person uses their voice to articulate.

8 Claims, 1 Drawing Sheet

(56) References Cited

U.S. PATENT DOCUMENTS

| | | | | |
|---|---|---|---|---|
| 2018/0268836 | A1* | 9/2018 | Krasnov | G10L 21/16 |
| 2019/0043471 | A1 | 2/2019 | Maziewski et al. | |
| 2020/0258518 | A1 | 8/2020 | Stachura | |
| 2020/0260186 | A1* | 8/2020 | Stachura | G10L 15/30 |
| 2020/0288240 | A1* | 9/2020 | Stachura | G06F 3/167 |

FOREIGN PATENT DOCUMENTS

| | | | |
|---|---|---|---|
| ES | 1215484 | U | 7/2018 |
| JP | H 0511780 | A | 1/1993 |
| JP | 4734627 | B2 | 7/2011 |
| WO | WO 98/38833 | A1 | 9/1998 |
| WO | WO 2016/001716 | A1 | 1/2016 |
| WO | WO 2016/111728 | A1 | 7/2016 |

OTHER PUBLICATIONS

Chen, Yuxin et al., “Wearable Microphone Jamming,” Proceedings of The 2020 CHI Conference on Human Factors in Computing Systems, ACMPub27, New York, NY, USA, Apr. 21, 2020; pp. 1-12.

International Preliminary Report on Patentability directed to related International Application No. PCT/EP2021/083699, mailed on Apr. 13, 2023, with attached English-language translation; 11 pages.

* cited by examiner

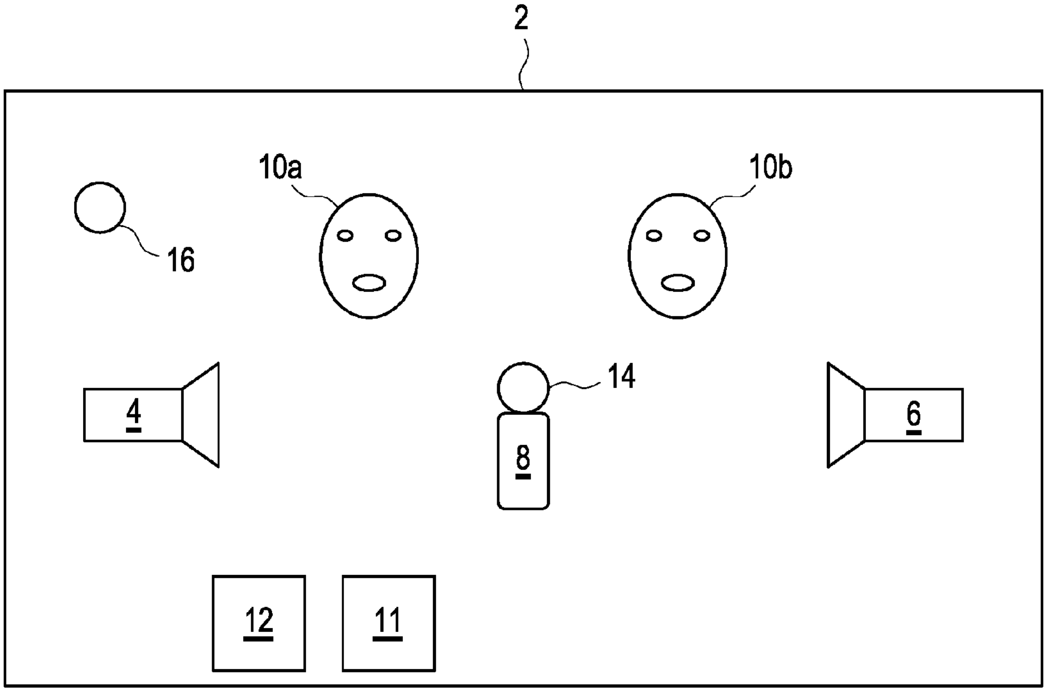
2
10a
10b
16
14
4
6
8
12
11

METHOD FOR PREVENTING A VOICE FROM BEING INTERCEPTED

TECHNICAL FIELD

The present disclosure relates to a method for preventing a voice in a vehicle from being intercepted, and a system for preventing a voice in a vehicle from being intercepted.

BACKGROUND

Document JPH0511780A describes a system for protecting a private sphere of occupants of a vehicle.

A vehicle and a system for controlling it are described in the document DE 10 2018 221 120 A1.

Document EP 2 876 639 A2 describes a system for masking a private conversation between occupants of a vehicle.

Against this background, an object was to guarantee a private sphere in a vehicle.

This object is achieved by a method and a system having the features of the independent claims. Embodiments of the method and the system are found in the dependent claims.

BRIEF DESCRIPTION OF DRAWINGS/FIGURES

FIG. 1 shows a schematic representation of an example of a vehicle for which one embodiment of the method according to the present disclosure is carried out with an embodiment of the system according to the present disclosure.

DETAILED DESCRIPTION

The method according to the present disclosure is intended for protection from eavesdropping or interception of a voice of at least one person in a vehicle—normally in the interior of the vehicle—wherein at least one loudspeaker arranged in the interior of the vehicle is activated, wherein the at least one loudspeaker is used to generate audio signals which have at least one frequency that is greater or higher than the threshold frequency for sound that is audible to the at least one person, wherein these audio signals are generated to interfere with the reception of a signal, or a signal reception quality, by at least one microphone when the at least one person uses their voice to articulate.

The at least one microphone that is to be or is interfered with using the method can be arranged in the vehicle, on the vehicle, inside the vehicle, and/or outside the vehicle.

In this case, it is possible for several audio signals to be generated and emitted or transmitted simultaneously or synchronously, with which the usual acoustic signal reception or the signal reception quality of the at least one microphone is disturbed.

In one embodiment, audio signals above the audible acoustic threshold frequency are generated by the at least one loudspeaker and can be configured or referred to as ultrasound signals and/or hypersound signals.

Accordingly, the method is also intended to prevent a conversation of at least one person, i.e., only one person or several persons, in a vehicle from being intercepted. In the method, at least during the conversation, at least one loudspeaker which is arranged in the vehicle is activated, wherein the at least one loudspeaker generates audio signals, i.e., at least ultrasound signals and/or hypersound signals, for interfering with a microphone or its signal reception. The conversation arises when the people use their voices to articulate and, in so doing, are speaking, e.g., conversing with one another. It is also possible, for example, for a single person's voice to be protected from eavesdropping or being intercepted if, for example, that person is singing or talking to themselves.

In the method, generally, several loudspeakers spatially distributed in the vehicle are activated to prevent eavesdropping. In this case, it is possible to modulate the audio signals with respect to their amplitude and/or frequency above the audible threshold frequency, wherein a temporal characteristic of the audio signals changes due to such a modulation. The audio signals are modulated in a possible modulation of their frequency within a frequency range which is above the audible threshold frequency within the ultrasound range and/or hypersound range. If several audio signals are generated synchronously, one audio signal can be modulated in each case.

The method makes it possible to secure a conversation between several people who are in the vehicle from interception.

The method can be carried out for a vehicle which has a closed interior which is delimited, inter alia, by a roof and window, wherein interception protection can also be realized if at least one window is open. Furthermore, such protection of a conversation from being intercepted is also possible for a vehicle designed as a convertible. Irrespective of a specific embodiment of the vehicle—generally, of a motor vehicle—the audio signals emanating from the at least one loudspeaker can be oriented in the direction of seat positions of persons and therefore of occupants in the vehicle, wherein these audio signals are for example oriented in the direction of a position of a head of a respective person in a correct sitting position. The position of the head is arranged above a seat surface of a respective seat of the vehicle. In this case, it is possible to check with a seat sensor which seat in the vehicle is occupied by a person, wherein the audio signals are aligned in particular in the direction of a head position of an occupied seat.

Activation of the at least one loudspeaker and therefore the audio signals can be accomplished by manual actuation of an activation switch, e.g., activation button, of an input device.

Furthermore, it is provided within the scope of the method that the at least one loudspeaker be aligned with a possible spatial position, e.g., a resident position, of the microphone in the vehicle.

In an embodiment of the method, a distinction can be made between different microphones. The microphone guarded against intercepting the conversation can therefore also be designated or configured as a third-party microphone and/or a microphone external to the vehicle, which is not part of an infrastructure of the vehicle. Such a third-party microphone can be located outside the vehicle, but also inside the vehicle, and can be designed as or termed a bug. Such a third-party microphone is generally independent of the vehicle. This differs from an in-vehicle microphone or a vehicle microphone which is designed as part of the infrastructure of the vehicle and is installed in the vehicle—in particular, in its interior. The voice of the at least one person is at least protected from interception by a third-party microphone. Since the at least one person can consciously or intentionally speak into an in-vehicle microphone or vehicle microphone, the sound signals for this—for example, in-vehicle—microphone can be compensated for.

In one embodiment, a respective conversation is protected from interception by a microphone if this is desired by the person, wherein the person activates the associated interception protection. In addition, for at least one first microphone, the voice of the at least one person can be protected from interception by the audio signals when this at least one first microphone is interfered with by audio signals. At the same time, a second microphone into which the at least one person intentionally speaks or wants to speak can still be used to pick up the voice of the at least one person by compensating for the audio signals if the at least one person deactivates such interception protection for the at least one second microphone by manually actuating another corresponding activation switch.

The system according to the present disclosure is designed for protecting a voice of at least one person in a vehicle from being intercepted, wherein the system has at least one loudspeaker in the vehicle, wherein the at least one loudspeaker is to be activated for interception protection and, in this case, is designed or configured to generate audio signals for interfering with signal reception or signal reception quality of at least one microphone which can be located in the vehicle, on the vehicle, inside and/or outside the vehicle, when the at least one person uses their voice to articulate. In this case, the audio signals generated by the at least one loudspeaker have a frequency which is greater or higher than a threshold frequency for sound which is audible to the at least one person.

Accordingly, the system is designed to prevent a conversation of at least one person in a vehicle from being intercepted. The at least one loudspeaker of the system is activatable or activated at least during the conversation. The at least one loudspeaker is designed to generate, at least during the call, audio signals, e.g., ultrasound signals and/or hypersound signal signals, for interfering with a microphone, wherein such a microphone, with respect to which the conversation is to be protected from interception, can also be designed or designated as a third-party microphone.

In one embodiment, the at least one loudspeaker is already arranged in the vehicle or in its interior. In this case, the at least one loudspeaker is designed as a component of an information and entertainment system or an infotainment system and/or a stereo system of the vehicle. As a rule, several such loudspeakers are already arranged in the vehicle and distributed spatially in the vehicle.

The presented system can have its own control unit, which is designed to monitor and therefore control and/or regulate the at least one loudspeaker, wherein, starting from this independent control unit, a generation of the audio signals and a possibly provided modulation of these audio signals is initiated.

Furthermore, the system has its own electrical energy supply, e.g., an energy source—usually a battery or a rechargeable battery—wherein this energy supply is designed to also supply the at least one loudspeaker with electrical energy independently of other energy sources of the vehicle, at least during the conversation, i.e., when the at least one person articulates their voice, and therefore enables emission of the audio signals. This independent energy supply is usually independent of an infrastructure and possibly also of a communications link with another vehicle-external device.

It is possible for an embodiment of the presented method to be carried out with an embodiment of the presented system.

With the method and the system, it is possible to prevent a private conversation and therefore also a corresponding private conversation in the vehicle from being intercepted.

Furthermore, it is also possible, if only one person who is alone in the vehicle and is on the phone, and therefore also conducting a conversation and therefore consciously or intentionally speaking into a telephone microphone, to secure this conversation, with the audio signals of the at least one loudspeaker, from being intercepted by, for example, a bug. In one possible embodiment, a telephone call, as a conversation of only one person in the vehicle, is prevented from being intercepted. This person speaks into a microphone of a terminal device designed as a telephone, e.g., a cell phone, or into a microphone of an in-vehicle telephone installed in the vehicle. In this case, the terminal device can be coupled to the system—usually to the control unit of the system for monitoring the at least one loudspeaker—and, for example, can receive information about the audio signals in real time from the control unit. The vehicle-independent terminal device is therefore aware of a time characteristic of the audio signals which can arise due to a modulation. The terminal device can therefore take into account the audio signals during the telephone call and accordingly compensate for them, wherein the microphone of the terminal device used for the telephone call can pick up and/or detect the voice of the person for the telephone call despite the audio signals. In contrast, the conversation intended as a telephone call is protected from being intercepted by any other microphones, and in particular by bugs, due to the audio signals. The same is also possible in the case where the person in the vehicle is intentionally speaking into a microphone of a dictaphone and accordingly articulates their voice.

A respective embodiment of the method and/or the system makes it possible for persons and therefore vehicle occupants to converse in the vehicle without their conversation potentially being intercepted. This makes it possible to protect a conversation from interception by a microphone designed as a vehicle microphone and also by a vehicle-external microphone of a third-party device. This relates, for example, to mobile telephones, watches with telephone functions, e.g., a so-called Apple Watch™, in particular when such a telephone is unconsciously or unintentionally spoken into. Furthermore, this also relates to microphones of online services, for example Alexa™ or Siri™. In addition, eavesdropping protection or interception protection from espionage using microphones of microphone-based devices, e.g., bugs, is also possible.

In one embodiment, audio signals are emitted by the at least one loudspeaker, wherein, at the same time, several audio signals can be transmitted at different frequencies above the audible threshold frequency. Such audio signals cause noise that interferes with acoustic reception or signal reception by microphones. It is therefore impossible to record a usable voice of a person. The system with the at least one loudspeaker for generating the audio signals, the control unit, and the power supply can be integrated into the infrastructure and therefore into an architecture of the vehicle, in contrast to third-party devices. However, the system can also be independent of the vehicle, as well as other third-party devices.

The method and the system can be used to counteract any spying, eavesdropping, or listening activities, even by supposedly harmless services such as Alexa™ or Siri™. This reduces a risk of unwanted hearing of a private conversation.

The system and the method enable selective use of several loudspeakers in the vehicle, wherein these can usually be loudspeakers already installed in the vehicle, e.g., of a high-end sound system. These loudspeakers generate or produce audio signals that are inaudible to a person at various frequencies above the audible threshold frequency when an embodiment of the method is carried out, and therefore generate corresponding noise to actively interfere with all microphones located in the vehicle. It is also possible, by means of the audio signals from the at least one loudspeaker, to interfere with microphones outside the vehicle that are directed at the vehicle or its interior.

In one embodiment, a conversation interception protection function or a corresponding privacy function that can be performed with the method and the system is activated via an activation switch and/or menu item of an input device of the vehicle, wherein the input device correspondingly communicates with the control unit of the system for activation, which communication is possible regardless of whether the at least one loudspeaker is already integrated into the vehicle or is additionally arranged in the vehicle as part of the system.

In the method, existing loudspeakers and/or additional loudspeakers in the vehicle are used to implement the function for preventing interception. The high-frequency audio signals above the audible threshold frequency are emitted so as to be positionally aligned, wherein a large number of loudspeakers, e.g., tweeters, are used. The loudspeakers are aligned with the probable resident positions of mobile terminal devices in the vehicle or its interior. At least one such resident position of a mobile terminal is provided, for example, by a center armrest, a center console, a side compartment in a door, a cockpit cross-member, and/or another shelf, receptacle, and/or holder for terminal devices in the vehicle. The loudspeakers can be positioned and therefore arranged at different locations in the vehicle. This applies, for example, to a headliner, a trim panel of an A, B, and/or C pillar, a mirror base, the cockpit cross-member, side trim parts, and/or seats of the vehicle.

In one possible embodiment of the method, it is taken into account that conventional loudspeakers of the infotainment system permanently belong to an infrastructure of the vehicle, which is why it is conceivable for these loudspeakers to be deactivated in the case of a hacker attack on the vehicle, thereby prevent the generation of the intended acoustic signals, and thus allowing eavesdropping on the persons in the vehicle. In this case, it is possible to specifically separate the at least one loudspeaker—usually, multiple loudspeakers—as part of a loudspeaker array from the vehicle's electronic infrastructure or architecture and protect it from external access via the Internet. For this purpose, the separate power supply, e.g., a separate circuit, of the system is provided, wherein this power supply with its own circuit has its own access, e.g., its own lead, to a battery, e.g., a 12-volt battery, of the vehicle, wherein the loudspeakers and the control unit of the system are supplied with electrical energy from this separate power supply for carrying out the method. In another embodiment, a usually hardware-supported activation switch is also connected to the system's own power supply for activating the at least one loudspeaker.

In another embodiment, it is possible for the at least one loudspeaker of the system to be retrofitted in the vehicle or for the vehicle to be supplied with electrical energy and operated via an electrical socket in the vehicle—for example, a cigarette lighter (cigarette lighter slot). It is therefore possible for the vehicle or its infrastructure to have no at least software-based access to the at least one loudspeaker. Accordingly, in such an embodiment, remote access to the at least one loudspeaker is also not possible. In such an embodiment, the system and therefore also the at least one loudspeaker are connected only to the electrical on-board power system as an energy supply of the vehicle, but are separated from a software-assisted infrastructure of the vehicle.

With the method and system, confidential, secret, and/or private conversations can be conducted in the vehicle without risk of unwanted interception.

It is understood that the features mentioned above and those still to be explained below can be used not only in the respectively specified combination, but also in other combinations or alone without departing from the scope of the present disclosure.

The present disclosure is schematically illustrated in the drawing by means of embodiments and is described schematically and in detail with reference to the drawing.

FIG. 1 shows a schematic representation of a vehicle 2, in the interior of which there are two persons 10*a*, 10*b*.

In addition, FIG. 1 shows the embodiment of the system according to the present disclosure which here has a first loudspeaker 4, a second loudspeaker 6, a control unit 11, and an electrical power supply 12 or a corresponding electrical power source. In this case, it is provided that the first loudspeaker 4 be permanently installed in the interior of the vehicle 2, e.g., as part of an infotainment system, whereas the second loudspeaker 6 is arranged independently of the vehicle 2 and, in its interior, at least temporarily, but also removably.

Furthermore, FIG. 1 shows a schematic representation of a first microphone 14, which is designed here as part of a mobile terminal device 8, e.g., a mobile phone, that is independent of the vehicle 2, and a second microphone 16 which is designed as part of an infrastructure of the vehicle 2.

In the embodiment of the method according to the present disclosure with the system presented here, it is provided that the two persons 10*a*, 10*b* want to engage in a conversation in the interior of the vehicle 2. In this case, there is a risk that their conversation could be intercepted by the microphone 14 of the terminal 8 and/or by the in-vehicle microphone 16 if it were to be hacked from the outside via the Internet.

To prevent this, in the embodiment of the method—if necessary, after activation by at least one of the persons 10*a*, 10*b*—the two loudspeakers 4, 6 are controlled by the control unit 11 and supplied with electrical energy originating from the power supply 12. In this case, the control unit 11 causes audio signals—here, ultrasonic signals—to be generated by the loudspeakers 4, 6 synchronously at different frequencies, wherein the frequencies are above an audible threshold frequency of the persons 10*a*, 10*b* in the vehicle 2. These high-frequency audio signals are transmitted or emitted by the loudspeakers 4, 6 into the interior and in particular in the direction of the microphones 14, 16 or their resident positions, wherein the high-frequency audio signals generate noise, wherein acoustic reception of voices of the persons 10*a*, 10*b* and therefore of the conversation by the microphones 14, 16 is prevented, wherein the conversation is accordingly protected from interception.

REFERENCE NUMBERS

- 2 Vehicle
- 4, 6 Loudspeaker
- 8 Terminal device
- 10*a*, 10*b* Person
- 11 Control unit
- 12 Energy supply
- 14, 16 Microphone

The invention claimed is:

1. A method for protecting a voice of at least one person in a vehicle from being intercepted, the method comprising:

activating at least one loudspeaker in the vehicle;

generating audio signals with the at least one loudspeaker, wherein the audio signals have at least one frequency higher than a threshold frequency for sound that is audible to the at least one person; and in response to the at least one person using their voice to articulate a sound signal, using the generated audio signals to interfere with a reception of the sound signal by a first microphone or a second microphone, wherein the sound signal is nevertheless picked up by the second microphone and interference protection for the second microphone is deactivated, if the at least one person manually activates an activation switch.

2. The method of claim 1, further comprising securing, from interception, a conversation between several persons in the vehicle.

3. The method of claim 1, further comprising securing, from interception, the voice of the at least one person in an interior of the vehicle by the at least one loudspeaker directed into the interior.

4. The method of claim 1, further comprising activating the at least one loudspeaker by the at least one person.

5. The method of claim 1, further comprising directing the at least one loudspeaker towards a position of the first microphone or the second microphone.

6. A system for preventing a voice of at least one person in a vehicle from being intercepted, the system comprising:

a first microphone;

a second microphone;

at least one loudspeaker in the vehicle, wherein the at least one loudspeaker is configured to generate, upon activation, audio signals having at least one frequency higher than a threshold frequency for sound that is audible to the at least one person;

wherein the audio signals are configured to interfere with a reception of a sound signal by one of the first microphone or the second microphone, wherein the sound signal is generated by the voice of the at least one person, and wherein the sound signal is nevertheless picked up by the second microphone if the at least one person deactivates interference protection of the second microphone by manual activation of an activation switch.

7. The system of claim 6, further comprising an independent control unit configured to control the at least one loudspeaker.

8. The system of claim 6, further comprising an independent electrical power supply configured to supply the at least one loudspeaker with electrical energy.

* * * * *